(No Model.)

G. T. EAMES.
SPLIT PULLEY.

No. 439,493. Patented Oct. 28, 1890.

Witnesses:
A. Ruppert.
E. Cruse

Inventor:
Gardner T. Eames,
by G. H. W. T. Strauss
attys.

UNITED STATES PATENT OFFICE.

GARDNER T. EAMES, OF RACINE, WISCONSIN, ASSIGNOR TO THE EAMES PULLEY COMPANY, OF KALAMAZOO, MICHIGAN.

SPLIT PULLEY.

SPECIFICATION forming part of Letters Patent No. 439,493, dated October 28, 1890.

Application filed October 11, 1888. Serial No. 287,793. (No model.) Patented in Canada July 6, 1888, No. 29,455.

*To all whom it may concern:*

Be it known that I, GARDNER T. EAMES, of Racine, in the county of Racine and State of Wisconsin, have invented certain new and useful Improvements in Split Pulleys, (for which Letters Patent, No. 29,455, were granted in Canada, July 6, 1888,) of which the following is a specification, reference being had to the accompanying drawings, and to the letters of reference marked thereon.

My invention is designed to be an improvement on the pulley described in my patent, No. 375,415, dated December 27, 1887, the object being mainly to reduce the cost of producing pulleys of that description without in the least impairing their efficiency.

To this end my invention consists in providing the interior of the hub of a pulley with raised portions to serve as bearing-points for removable supplemental bearings, which enable the hub of the pulley to be applied to shafts of different diameters, all of which will be hereinafter fully described, and pointed out in the claim.

Figure 1:
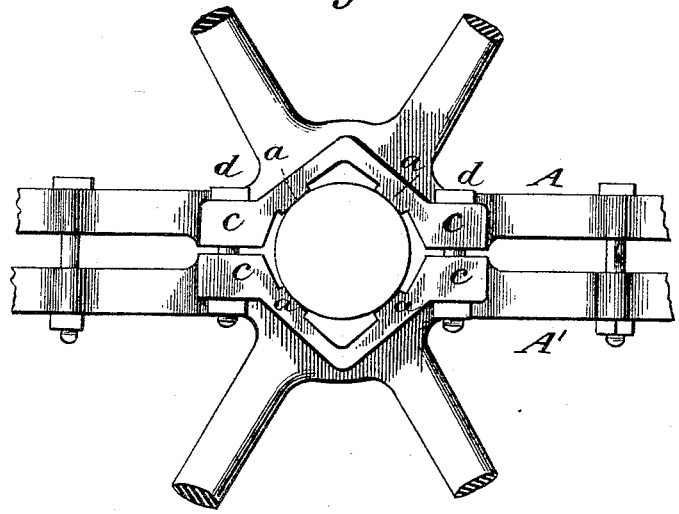
Figure 2:
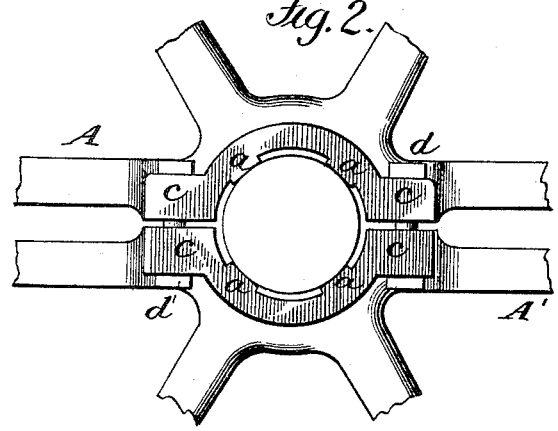
Figure 3:
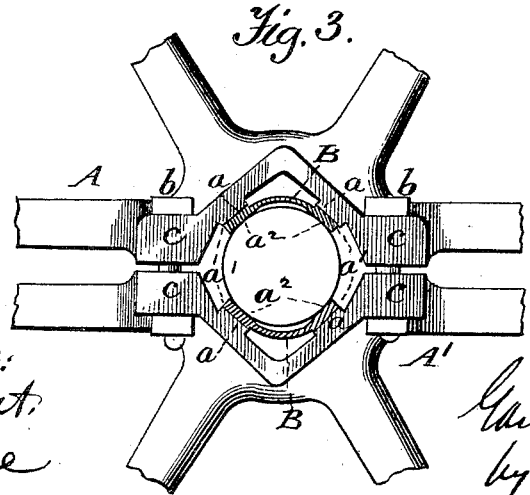

In the accompanying drawings, Figure 1 is a side view of the hub portion of a pulley embodying my invention. Fig. 2 is a similar view showing a modified form of construction. Fig. 3 shows the application of bushings, as hereinafter specified.

A A' represent two halves of a spider, the hub portion of which is provided, as shown in Fig. 1, with a square or diamond-shaped hole, one half of which is comprised in each half of the spider. The inner face of the hole of the hub is provided with raised bearing-points $a$. As herein shown, four are used—two in each half of the hub—but I do not limit myself to four, as three, four, or more bearing-points may be employed with equal advantage. By the use of the raised bearing-points it is evident that less work is required in planing out or dressing the interior of the hub, and that the manufacture of the pulley is materially cheapened. Each half of the hub is provided with ordinary lugs $c$ through which the bolts $d$ pass. The two halves of the spider are also shown drawn together by bolts which pass through the arms.

In order to adapt the hub to shafts of different sizes, bushings B (shown in Fig. 3) are used. Two bushings are used with each hub, and are provided with bearing-points $a'$, corresponding with those $a$ of the hub, and flat portions $a^2$ on the inside, which bear upon the shaft. It will be seen that in finishing these bushings it is only necessary to plane or face off the portions $a'$ and $a^2$ at each end, and much time will therefore be saved.

In Fig. 2 the hole in the hub is shown circular, the same raised bearing-points being employed. I do not limit myself to the shape of the hole in the hub.

Having described my invention, I claim—

In a divided pulley, a spider, the hub portion of which is provided with raised bearing-points combined with bushings having exterior corresponding bearing-points and inner flat portions, said bushings resting on the raised bearing-points, substantially as set forth.

In testimony whereof I have hereunto set my hand and seal.

GARDNER T. EAMES. [L. S.]

Witnesses:
  H. A. COOPER,
  WILLIAM E. LEE.